United States Patent [19]

Poling

[11] 4,188,145
[45] Feb. 12, 1980

[54] ASSEMBLY AND METHOD OF ASSEMBLING

[75] Inventor: Ronald W. Poling, Morrison, Ill.

[73] Assignee: General Electric Company, Fort Wayne, Ind.

[21] Appl. No.: 912,224

[22] Filed: Jun. 5, 1978

[51] Int. Cl.$^2$ ............................................. F16B 9/00
[52] U.S. Cl. .................................. 403/112; 403/247; 403/254; 29/451; 29/453; 24/224
[58] Field of Search ................ 403/52, 113, 117, 241, 403/247, 354, 253, 254, 375, 112; 24/224 R, 222 R; 29/451, 453, 434

[56] References Cited
U.S. PATENT DOCUMENTS

| | | | |
|---|---|---|---|
| 2,049,869 | 8/1936 | Rohrs | 24/224 R |
| 2,632,221 | 3/1953 | Wurzel | 24/224 R |
| 3,422,236 | 1/1969 | Kircher | 200/336 X |

*Primary Examiner*—Andrew V. Kundrat
*Attorney, Agent, or Firm*—Joseph E. Papin

[57] ABSTRACT

An assembly for use in a condition responsive mechanism. The assembly includes a housing part having aperture means therethrough and a control device rotatably assembled at least in part in the aperture means for selecting a set temperature of the condition responsive mechanism. The housing part has a pair of sections extending generally about at least a part of the aperture means and predeterminately spaced in off-set relation with respect to each other. The control device has a body portion formed of a generally resilient resin material and includes groove means extending thereabout for receiving in rotatable abutment the off-set sections. The groove means defines with the body portion at least one flange thereon with the flange being displaced in response to the rotatable abutment of the groove means and off-set sections so as to resile and exert a force acting to maintain the rotatable abutment between the groove means and the off-set sections.

A method of assembly is also disclosed.

21 Claims, 6 Drawing Figures

ASSEMBLY AND METHOD OF ASSEMBLING

FIELD OF THE INVENTION

This invention relates generally to condition responsive mechanisms and in particular to an assembly therefor including a housing part and a control device adapted for selecting a set temperature of the condition responsive mechanism and also in particular to a method of assembling the control device and the housing part.

BACKGROUND OF THE INVENTION

In some refrigeration systems, such as may be employed with a room air conditioner or a refrigerator or the like for instance, various types of past condition responsive mechanisms were utilized to control the operation of such refrigeration systems. These condition responsive mechanisms generally included switch means for energizing and deenergizing various electrical components of the refrigeration system, and such switch means were actuated by various types of actuators operable generally in response to temperature sensing means associated therewith for sensing the temperature of a given space conditioned by the refrigeration system. Of course, these past condition responsive mechanisms could be adjusted so as to operate in response to a selected set-point temperature for the given space as sensed by the temperature sensing means of the condition responsive mechanisms. In order words, a control device was adjustably associated with the condition responsive mechanism and manually movable through a temperature range to a preselected or set-point temperature, and such manual movement of the control device, in effect, adjusted or biased an associated part of the actuator so that it actuated the switch means when the temperature sensing means of the actuator sensed the set-point temperature of the given space cooled by the refrigeration system. Of course, when so actuated, the switch means effected the energization or deenergization of the electrical components of the refrigeration system so as to effect the conditioning of the air of the given space. One such condition responsive mechanism utilizing a control device to select the set point temperature therefor, as discussed above, is disclosed in U.S. Pat. No. 3,648,214 issued Mar. 7, 1972 to John L. Slonneger, and this patent is incorporated by reference herein.

In at least one of the aforementioned past condition responsive mechanisms, a control device contained a plurality of different parts, such as for instance as many as five different parts, which were assembled together through an opening in a cover plate or housing part of the condition responsive mechanism, and it is believed that at least one disadvantageous or undesirable feature of this past assembled control device was that it was time consuming to effect the assembly of so many different parts. Another or an analogous disadvantageous or undesirable feature is believed to be that fixtures and equipment were necessary to effect the assembly of this aforementioned past control device with its cover plate. For instance, in the aforementioned assembly of the past control device, a steel shaft thereof was nested in a hydraulic press with a knurled end of the steel shaft exposed or facing upwardly. An annular steel washer was placed about the knurled end of the shaft and rested on a shoulder thereof. A torque washer, such as an annular wavy metal spring for instance, was then disposed on top of the steel washer, and one side of a cover plate about an opening therethrough was disposed so as to be engaged on top of the torque washer. Thereafter, an annular zinc cam was pressed onto the knurled end of the shaft with a flange of the zinc cam engaging the opposite side of the cover plate. To complete this assembly, the knurled end was staked or swagged over into displacement preventing engagement with the zinc cam. It was also necessary to provide a lubricant between the flange of the cam and the opposite side of the cover plate which is also believed to be a disadvantageous or undesirable feature.

SUMMARY OF THE INVENTION

Among the several objects of the present invention may be noted that provision of an improved assembly and an improved method of assembling a housing part of a condition responsive mechanism and a control device adapted for selecting a set temperature therefor which overcome the above discussed disadvantageous or undesirable features, as well as others, of the prior art; the provision of such improved assembly and method in which the control device has a unitary body formed of a generally resilient resin material; the provision of such improved assembly and method in which the housing part is formed to receive the body of the control device in displacement preventing engagement; the provision of such improved assembly and method in which a flange on the body of the control device is deformable not only to provide rotational torque between the control device and the housing part but also to retain the control device against displacement from the housing part upon the assembly thereof; the provision of such improved assembly and method in which the control device and housing part lend themselves to automatic assembly; and the provision of such improved assembly and method in which the components thereof are simplistic in design, economically manufactured and easily assembled. These as well as other objects and advantageous features of the present invention will be in part apparent and in part pointed out hereinafter.

In general, as assembly in one form of the invention is adapted for use in a condition responsive mechanism. The assembly has a housing part adapted for association with the condition responsive mechanism, and aperture means is provided in the housing part. A control device rotatably mounted at least in part in the aperture means is adapted for selecting a set temperature of the condition responsive mechanism. The control device has a body formed of a resin material with a resilient yieldable characteristic, and groove means in the body extends generally thereabout and has a pair of opposed sidewalls. A pair of opposite sections on the housing part are arranged generally in off-set relation with each other about at least a part of the aperture means and are disposed in releasable wedging abutment between the opposed sidewall pair of the groove means, respectively. At least one of the sidewalls of the groove means is yieldable with respect to the body in response to the releasable wedging abutment therewith of one of the sections of the housing part to establish a force acting to maintain the sidewall pair against displacement from their respective releasable wedging abutments with the section pair.

Further in general and in one form of the invention, an assembly adapted for use in a condition responsive mechanism has a housing part with aperture means therethrough and at least a pair of sections on the housing part arranged generally in opposite facing opposite about a part of the aperture means. A rotatable control device adapted for selecting a set point temperature of the condition responsive mechanism has a body of a generally resilient material, and groove means in the body extends thereabout. In a method of assembling the control device with the housing part, the groove means is registered with at least a part of the aperture means, and a pair of confronting parts on the body at least adjacent the groove means are arranged with respect to the section pair for releasable engagement therewith, respectively. At least one of the confronting parts on the body is deformed in response to the respective releasable engagement of the confronting parts pair of the body with the section pair, and a force is established in response to the deformation of the at least one confronting part on the body with the force acting to maintain the releasable engagement of the confronting parts pair on the body with the section pair, respectively.

BRIEF DESCRIPTION OF THE DRAWINGS

Corresponding reference characters refer to corresponding parts throughout the several views of the drawings.

The exemplifications set out herein illustrate the preferred embodiment of the invention in one form thereof, and such exemplifications are not to be construed as limiting the scope of the disclosure or the scope of the invention in any manner.

DETAILED DESCRIPTION OF THE PREFERRED EMBODIMENT

Figure 1:
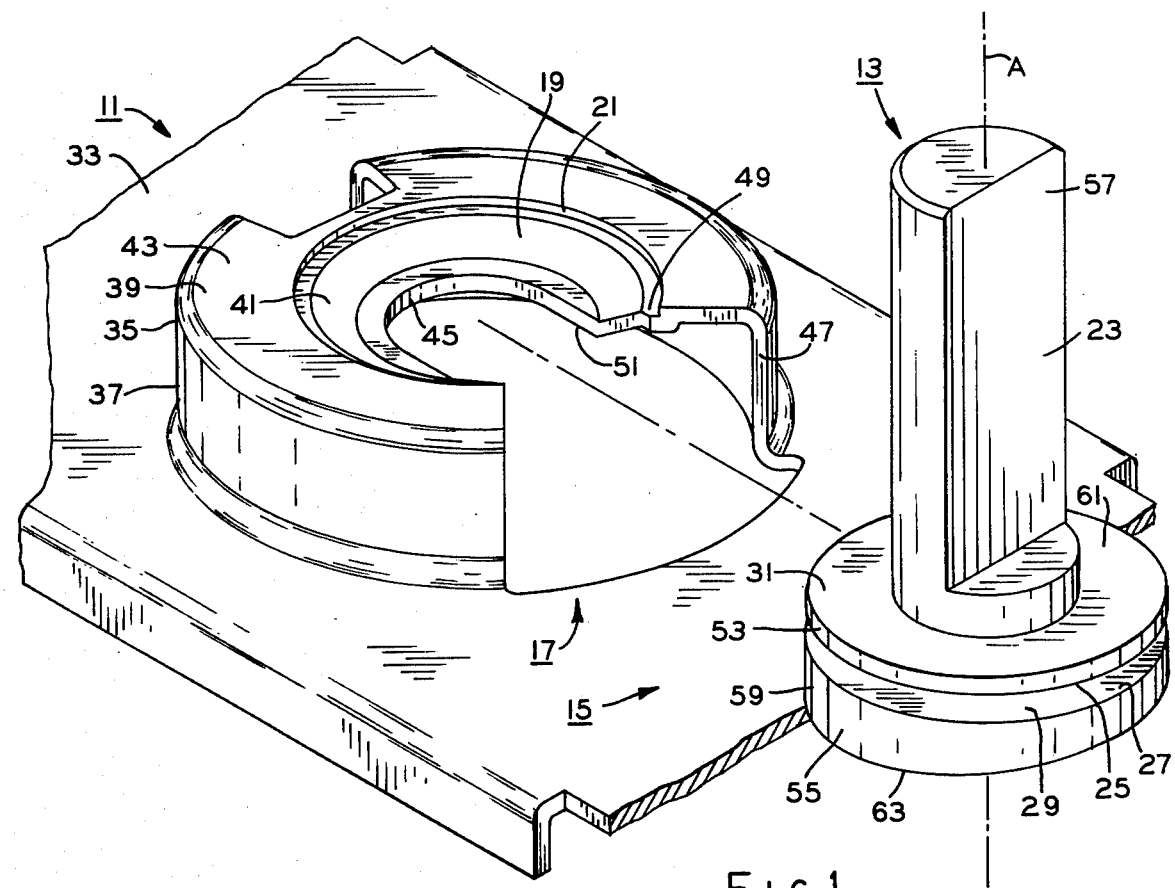
FIG. 1 is an exploded isometric view illustrating in one form of the invention an assembly including a control device adapted for selecting a set temperature of a condition responsive mechanism and a housing part of the condition responsive mechanism as well as teaching principles which may be utilized in a method of assembling the control device and the housing part also in one form of the invention.
Figure 5:
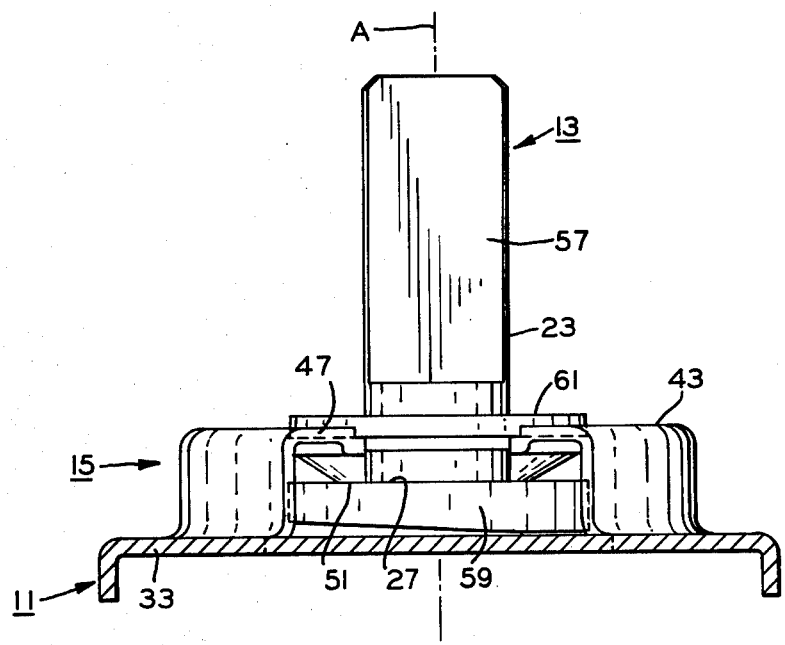
FIG. 5 is a right side elevational view of the assembly of FIG. 2.
Figure 2:
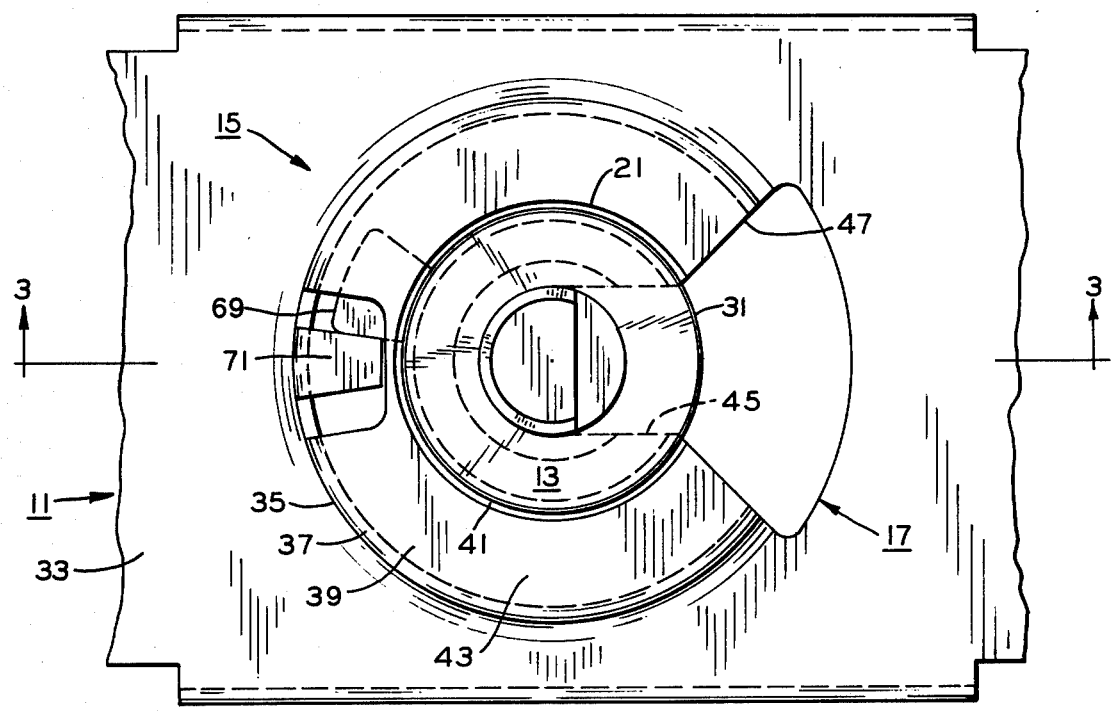
FIG. 2 is a plan view of the assembly of FIG. 1.
Figure 3:
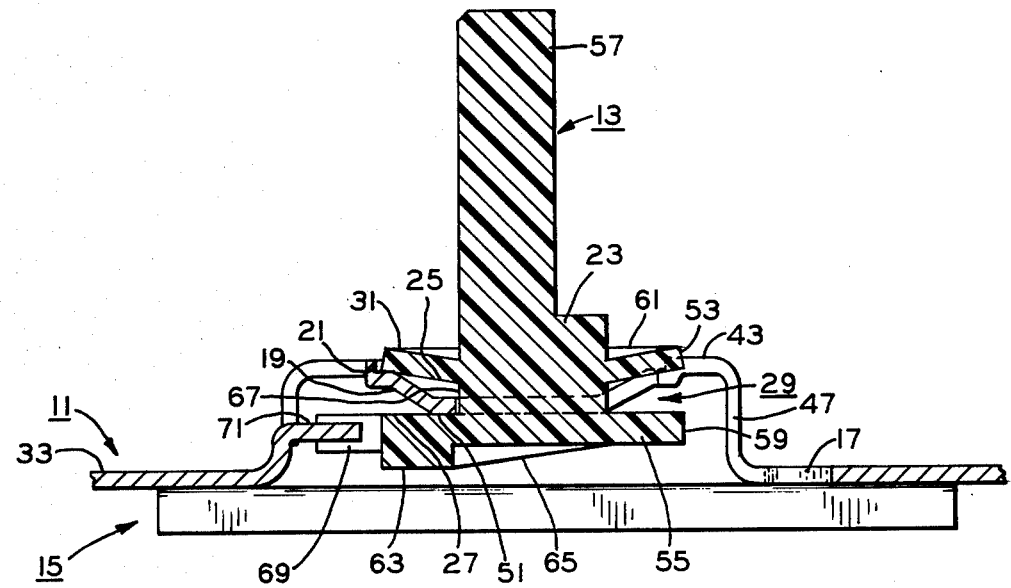
FIG. 3 is a sectional view taken along line 3—3 of FIG. 2.
Figure 6:
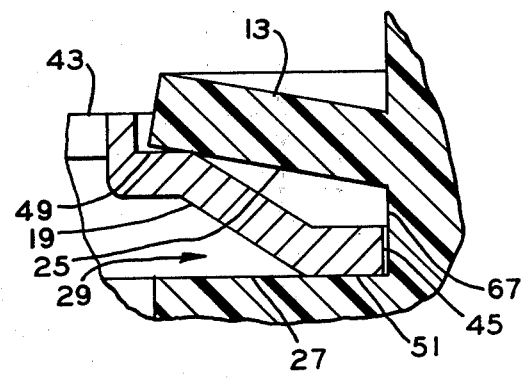
FIG. 6 is an enlarged fragmentary view taken from FIG. 3.

Referring now to the drawings in general, there is illustrated in one form of the invention a method of assembling a housing part or cover plate 11 and a control device 13 adapted for use in a condition responsive mechanism (not shown), such as for instance that illustrated in the aforementioned U.S. Pat. No. 3,648,214 (FIG. 1). Housing part 11 and control device 13 comprise an assembly 15 and are adapted to be releasably secured or engaged together in an assembly position against displacement (FIGS. 1 and 2). Housing part 11 has an aperture means 17 intersecting with at least a pair of angularly disposed walls or wall means, such as a base wall 19 and an integral peripheral of rim wall 21 thereof, and control device 13 is rotatably arranged on the housing part for selecting a set point temperature of the aforementioned condition responsive mechanism with the control device having a body 23 of a generally resilient material, such as for instance a resin material or a thermosetting plastic or the like having a resilient yieldable characteristic (FIG. 3). In one exemplification of this assembling method, a pair of means, such as opposed sidewalls 25,27 of a generally annular groove or groove means 29, which are provided in body 23 for rotative abutment, are urged into releasable engagement with opposite sides of base wall 19 confronting therewith generally about a part of aperture means 17 (FIGS. 3 and 6). Means, such as a generally annular flange or flange means 31, is disposed or otherwise arranged at least adjacent rim wall 21 for engagement or abutment therewith so as to capture body 23 in the assembly position thereof on housing part 11 against displacement through aperture means 17 when rotative abutment means or groove sidewalls 25,27 are urged into the releasable engagement with the opposite sides of base wall 19, respectively, (FIG. 3).

More particularly and with specific reference to FIGS. 1 and 2, housing part 11 may be formed from a suitable metallic sheet material if desired and has a generally planar mounting portion or section 33 which is adapted to be secured generally in cover like fashion for instance onto the aforementioned condition responsive mechanism. A hub 35 or the like is integrally formed on mounting portion 33 having a generally annular or peripheral sidewall 37 extending therefrom, and an end wall 39 is integrally formed with the peripheral sidewall in spaced relation with the mounting portion. A recess or recess means 41 is provided in hub end wall 39 and defined by base wall 19 and rim wall 21 which are integral parts of end wall 39, and base wall 19 is disposed in spaced relation between mounting portion 33 and an upper generally annular portion 43 of the end wall extending about the recess.

Figure 4:
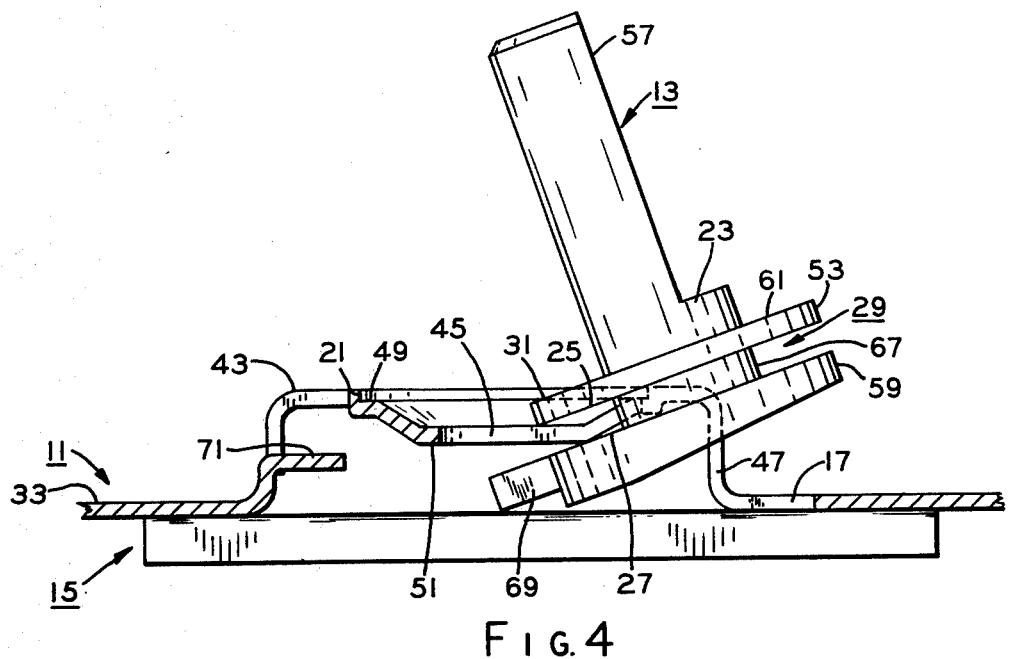
FIG. 4 is a partial sectional view showing the control device of FIG. 1 disposed in an entry position with respect to the housing part of FIG. 1.

In the assembly of control device 13 into its assembled or assembly position onto housing part 11, an operator or assembly worker may pass or otherwise lead body 23 into aperture means 17; however, it is contemplated that control device 13 may be automatically assembled into its assembly position on housing part 11 within the scope of the invention so as to meet the objects thereof. Aperture means 17 includes an opening 45 and a generally divergent slot or slot means 47 which intersects mates or otherwise communicates with the opening. Opening 45 extends through at least base wall 19 and is sized so as to receive groove means 29 of body 23, and slot means 47 extends through at least peripheral sidewall 37, upper portion 43 of end wall 39 and rim wall 21 of hub 35 with the slot means being sized so as to receive or pass body 23. As body 23 is passed into slot means 47, groove means 29 of the body is registered or otherwise aligned with opening 45. Upon this registration of groove means 29 with opening 45, opposed sidewalls 25,27 of the groove means may be interfitted or otherwise engaged with base wall 19 and upon portion 43 of hub end wall 39, as best seen in FIG. 4. In this entry position, it may be noted that control device 13 is cocked or otherwise angularly disposed with respect to housing part 11, and at this time, an applied force may be exerted by the operator on body 23 so as to move or enter groove means 29 further into or toward opening 45. As previously mentioned, the resin material of body 23 is provided with a preselected resilient characteristic, and in response to the applied force exerted on body 23 effecting the movement thereof further toward opening 45, sidewall 25 of groove means 29 in engagement with top portion 43 of hub end wall 39 is wedged or otherwise deformed in a direction generally away from opposed sidewall 27 of the groove means which is engaged with base wall 19. In this manner, the wedging or relative movement of sidewall 25 away from sidewall 27 of groove means 29 in effect spreads or opens the groove means so that flange 31 on body 23 is urged or otherwise deformed toward a displaced position with respect to body 23. As groove means 29 is passed or further moved into a seated or rotatable position within opening 45 in response to the applied force exerted on body 23, as best seen in FIGS. 3 and 6, it may be noted that sidewall 27 is urged toward or disposed in seating or rotatable abutment on a confronting one of a pair of opposite facing and off-set sections 49,51 provided on the opposite sides of base wall 19 and extending generally about opening 45. During this movement of groove means 29 into its seated position within opening 45, sidewall 25 of the grove means is, of course, disengaged from upper portion 43 of hub end wall 39 causing flange 31 to resile or snap from its displaced position toward the assembly position thereof within recess 41 thereby to urge sidewall 25 into seating or rotatable abutment with confronting section 49 on base wall 19. It may be noted that the spaced apart or off-set relation between sections 49,51 is predeterminately greater than that between sidewalls 25,27 of groove means 29. Thus, when sidewalls 25,27 of groove means 29 are respectively engaged with sections 49,51 of base wall 19 in the assembly position of body 23, it may also be noted that flange 31 is deformed with respect to the body, i.e., in another displaced position with respect thereto, in order to establish a resilient force acting to releasably maintain or resiliently urge sidewalls 25,27 of groove means 29 in the rotatable engagement with sections 49,51 of base wall 19, respectively. Upon the resiling of flange 31 so as to dispose body 23 of control device 13 in the assembly position thereof on housing part 11, it may also be noted that at least a part of a peripheral or marginal edge 53 on flange 31 is captured or otherwise positioned within recess 41 at least generally adjacent rim wall 21 of the recess for abutment therewith. Thus, when sidewalls 25,27 of groove means 29 are respectively urged into engagement with sections 49,51 on base wall 19 by the aforementioned resiling effect of flange 31, the abutment between marginal edge 53 of flange 31 and rim wall 21 of recess 41 serves to prevent displacement movement of body 23 through opening 45 and slot means 47 from the assembled position of the body on housing part 11.

Referring again in general to the drawings and recapitulating at least in part with respect to the foregoing, assembly 15 in one form of the invention has housing part 11 which is adapted for association with the condition responsive mechanism, and aperture means 17 is provided in the housing part (FIGS. 1 and 2). Control device 13 is rotatably mounted at least in part in aperture means 17 and is adapted or operable for selecting the set point temperature of the condition responsive mechanism (FIGS. 1 and 2). Control device 13 has body 23 formed of a resin material and having a resilient or yieldable characteristic, and groove means 29 having opposed sidewalls 25,27 is provided in the body extending generally thereabout (FIGS. 1, 3, 4 and 6). Section pair 49,51 on housing part 11 are arranged generally in opposite facing and off-set relation with respect to each other about at least a part of aperture means 17 and are disposed in releasable wedging abutment between sidewalls 25,27 of groove means 29, respectively (FIG. 6). Sidewall 25 of groove means 29 is yieldable with respect to body 23 in response to the releasable wedging abutment therewith of section 49 on housing part 11 to establish a force acting to maintain sidewalls 25,27 against displacement from their respective releasable abutments with sections 49,51 (FIGS. 3 and 6).

More particularly and with specific reference to FIGS. 1 and 3, body 23 of control device 13 may be molded or otherwise formed into a unitary or integral construction having groove means 29 interposed between flange 31 and another flange 55 spaced therefrom which defines an integral cam or cam portion. Additionally, a knob receiving or securing element, such as for instance a flatted stem or shaft 57, may also be integrally formed on body 23 with flange 31 thereof so as to extend generally coaxially with a rotational axis A of the body. Although stem 57 is shown for purposes of disclosure, it is contemplated that other knob receiving elements or structures having other configurations may be utilized with body 23 within the scope of the invention so as to meet the objects thereof.

Groove means 29 is predeterminately located about body 23 with respect to its axis A so that the axial thickness of flange 31 is predeterminately less than that of cam portion 55. As a result, the deformation, deflection or resilient urging of flange 31 when sidewall 25 is engaged with section 49 of housing part 11 may be predetermined, as well as the resiling effect of the flange, so as to control the intensity or value of the force established by the flange to maintain the engagement of sidewalls 25,27 of groove means 29 with section pair 49,51 on base wall 19. In contrast to the predetermined deformation or resiliency afforded to flange 31, it may also be noted that the aforementioned predetermined axial location of groove means 29 of body 23 provides cam portion 55 with a predetermined axial thickness that insures its rigidity or stiffness so as to generally obviate any deformation or resilient deflection thereof in response to the engagement of sidewalls 25,27 of groove means 29 with section pair 49,51 on base wall 19. Of course this rigidity so afforded cam portion 55 is desirable since the cam portion is intended to drive or otherwise engage and operate a cam follower (not shown) of the condition responsive mechanism.

Body 23 is provided with a generally cylindric outer or peripheral surface 59 interposed between a pair of opposite ends or end portions 61,63 and stem 57 is integrally arranged with or connects to body end 61 generally centrally thereof while body end 63 defines a generally spiral cam surface 65 for engagement with the aforementioned follower of the condition responsive device. Groove means 29 is predeterminately axially located in body 23 between opposite ends 61,63 thereof, as previously mentioned, and the groove means is provided with a generally annular, axially extending base or cross wall 67 interposed between sidewalls 25,27 thereof which intersect with outer surface 59 of body 23. Thus, generally annular flange 31 is defined on body 23 at least in part between sidewall 25 of groove means 29 and body end 61, and the portion of outer surface 59 between groove sidewall 25 and body end 61 defines marginal edge 53 of the flange. Cam portion 55 of body 23 is defined between sidewall 27 of groove means 29 and body end 63 on which cam surface 65 is defined, as previously mentioned. To complete the description of assembly 15, a finger or stop 69 is integrally provided on outer surface 59 of body 23 so as to extend generally radially therefrom, and the stop is engageable with opposite sides of a tab 71 integral with hub 35 and bent therefrom so as to limit the rotational movement of control device 13 with respect to housing part 11.

When control device 13 is assembled into the assembly position thereof on housing part 11, as previously discussed, cross wall 67 of groove means 29 is rotatably disposed or seated within opening 45 of housing part 11 at least closely adjacent thereto, and opposed sidewalls 25,27 are disposed at least in part in rotatable abutting engagement with sections 49,51 on base wall 19. Since sections 49,51 are predeterminately axially spaced apart farther than opposed sidewalls 25,27 of groove means 29, as previously mentioned, the engagement of the sidewalls with the sections in effect displaces or wedges sidewall 25 away from sidewall 27 thus effecting displacement or deflection of flange 31 with respect to body 23. This deformation of flange 31 establishes the aforementioned resilient force which not only acts to releasably maintain sidewalls 25,27 of groove means 29 in the rotatable abutment thereof with sections 49,51 of base wall 19 but also provides a controlled or predetermined rotational torque between control device 13 and housing part 11. Further, the resiling of flange 31 in response to the wedged apart engagement of sidewalls 25,27 of groove means 29 with sections 49,51 of base wall 19 also acts to maintain at least a part of marginal edge 53 of the flange within recess 41, and in this manner the marginal edge is disposed at least closely adjacent rim wall 21 of the recess to prevent the displacement of body 23 from its assembled position through aperture means 17.

In order to adjust the set point temperature of the condition responsive mechanism when assembly 15 is associated therewith, a rotational force may be applied onto stem 57 of body 23. When the applied rotational force overcomes the rotational torque or gripping engagement between sidewalls 25,27 of groove means 29 and sections 49,51 on base wall 19, body 23 is rotated in its assembly position about axis A thereof with respect to housing part 11 toward a selected set point temperature for the condition responsive mechanism. This applied force rotation of body 23 conjointly effects rotation therewith of cam surface 65 on cam portion 55 of the body which is adapted to adjustably bias an associated part (not shown) of the condition responsive mechanism thereby to select the set point temperature at which the condition responsive mechanism will operate.

In view of the foregoing, it is now apparent that a novel assembly 15 and a novel method of assembling such have been presented meeting the objects and advantages set out herein, as well as others, and it is contemplated that changes as to the precise arrangements, shapes and details of the component parts of the assembly and also as to the precise order of the method steps may be made by those having ordinary skill in the art without departing from the spirit of the invention or the scope of the invention as set out in the claims which follow.

What I claim as new and desire to secure by Letters Patent of the United States is:

1. In an assembly adapted for use in a condition responsive mechanism and with the assembly including a housing part and a rotatable control device adapted for selecting a set point temperature of the condition responsive mechanism, a recess in the housing part and having a base wall with a peripheral wall disposed in angular relation generally thereabout, an opening extending through at least the base wall, a divergent slot means communicating with the opening and extending through at least the peripheral wall, at least a pair of sections of the base wall and arranged in opposite facing and off-set relation with respect to each other generally adjacent the opening, the control device having a body of generally resilient resin material, annular groove means in the body extending thereabout and having a pair of opposed sidewalls, one of the opposed sidewalls defining with the body an annular flange adjacent an end portion of the body, a method of assembling the control device in an assembly position on the housing part comprising the steps of:

(a) passing a part of the body into the slot means toward the opening;

(b) registering a part of the groove means with the opening;

(c) engaging the opposed sidewall pair of the groove means with the base wall and at least a portion of the housing part disposed generally about the peripheral wall of the recess, respectively, upon the registering of the groove means with the opening;

(d) entering the groove means further into the opening with the opposed sidewall pair of the groove means respectively engaged with the base wall and the at least portion of the housing part and wedging at least one of the opposed sidewalls away from the other thereof so as to generally urge the flange toward a displaced position;

(e) moving the groove means into a position in the opening generally defining the assembly position of the control device with respect to the housing part with the other of the opposed sidewalls of the groove means disposed for rotatable engagement on one of the sections of the at least pair thereof on the base wall and disengaging the flange from the at least portion of the housing part;

(f) resiling the flange from its displaced position toward another position resiliently urging the at least one opposed sidewall of the groove means into rotatable engagement on the other of the sections of the at least pair thereof on the base wall and establishing thereby a force acting to releasably maintain the rotatable engagement of the opposed sidewall pair of the groove means on the section pair of the base wall; and (f) capturing at least a part of the flange means within the recess at least generally adjacent the peripheral wall on the housing part for abutment therewith when the opposed sidewall pair of the groove means are respectively rotatably engaged on the section pair of the base wall so as to prevent the displacement movement of the body through the slot means and opening from the assembled position of the body on the housing part.

2. In an assembly adapted for use in a condition responsive mechanism and including a housing part, a recess in the housing part having a base wall with a pair of opposite sides and a peripheral wall disposed about the base wall, aperture means intersecting with the peripheral wall and the base wall, a rotatable control device adapted for selecting a set point temperature of the condition responsive device and having a body of a generally resilient resin material, and flange means on the body, a method of assembling the control device into an assembled position on the housing part comprising the steps of:

(a) engaging the flange means with a portion of the housing part at least adjacent the recess and disposing another part of the body with one of the opposite sides of the recess base wall;

(b) moving the body toward the recess and biasing the flange means in its engagement with the housing part portion toward a displaced position with respect to the another body part in response to such movement;

(c) positioning the another body part in releasable rotative abutment with the one opposite side of the recess base wall generally about a part of the aperture means and resiling the flange means from its displaced position into releasable rotative abutment with the opposite side of the recess base wall generally about the part of the aperture means thereby to arrange the body in its assembled position on the housing part with respect to the recess; and (d) capturing at least a part of a peripheral portion of the flange means within the recess and at least adjacent the peripheral wall thereof when the another body portion and the flange means are respectively in the releasable rotative abutment with the one and other opposite sides of the recess base wall so as to prevent displacement movement on the body from its assembled position on the housing part through the aperture means.

3. In an assembly adapted for use in a condition responsive mechanism and including a housing part having aperture means intersecting with at least a pair of angularly disposed wall means thereof, a control device rotatably arranged on the housing part for selecting a set-point temperature of the condition responsive mechanism and having a body of a generally resilient material, a method of assembling the control device into an assembly position on the housing part comprising the steps of: urging a pair of opposed means on the body for rotative abutment into releasable engagement with opposite sides of one of the wall means of the at least pair thereof generally about a part of the aperture means and disposing a means on the body at least adjacent the other of the wall means of the at least pair thereof for engagement therewith so as to capture the body in the assembled position on the housing part against displacement therefrom through the aperture means when the rotative abutment means on the body are urged in the releasable engagement with the opposite sides of the one wall means, respectively.

4. The method as set forth in claim 3 comprising the preliminary step of entering a part of the body through the aperture means toward the assembly position of the body on the housing part.

5. The method as set forth in claim 3 comprising the preliminary step of displacing at least one of the rotative abutment means with respect to the other thereof and resiling the at least one rotative abutment means into its releasable engagement with a confronting one of the opposite sides of the one wall means.

6. The method as set forth in claim 1 wherein the urging and disposing step comprises arranging at least one of the rotative abutment means in a resiliently deformed position while in its engagement with one of the opposite sides of the one wall means and establishing a force acting to maintain the releasable engagement of the rotative abutment means pair with the opposite sides of the one wall means.

7. In an assembly adapted for use in a condition responsive mechanism and including a housing part with aperture means therethrough, at least a pair of sections on the housing part arranged generally in opposite facing relation about a part of the aperture means, and a rotatable control device adapted for selecting a set point temperature of the condition responsive mechanism and having a body of a generally resilient material, groove means in the body and extending thereabout, a method of assembling the control device with the housing part comprising the steps of:

(a) registering the groove means with at least a part of the aperture means and arranging a pair of confronting parts on the body at least adjacent the groove means with respect to the section pair for releasable engagement therewith, respectively; and (b) deforming at least one of the confronting parts on the body in response to the respective releasable engagement of the confronting parts pair of the body with the section pair and establishing a force in response to the deformation of the at least one confronting part on the body with the force acting to maintain the releasable engagement of the confronting parts pair on the body with the section pair, respectively.

8. The method as set forth in claim 7 comprising the additional step of disposing a means for abutment on the body at least adjacent another means for abutment therewith on the housing part so as to capture the body against displacement from the housing part through the aperture means when the force is acting to maintain the respective releasable engagement of the confronting parts pair on the body with the section pair.

9. An assembly adapted for use in a condition responsive mechanism, the assembly comprising a housing part of metallic sheet material and adapted for securement to the condition responsive mechanism, and a control device rotatably mounted to said housing part and operable generally for selecting a set temperature of the condition responsive mechanism; said control device including a unitary body of a resin material having a resilient characteristic, a generally cylindric peripheral surface on said body interposed between a pair of opposed end portions thereof, a cam surface integrally formed on one of said opposite end portions, a stem integrally formed on the other of said opposite end portions and extending therefrom, a generally annular groove means in said peripheral surface extending about said body generally adjacent said other opposite end portion and having a pair of opposed spaced apart sidewalls, an annular displacement flange defined on said body at least in part between one of said sidewalls of said groove means and said other opposite end portion, and a peripheral margin on said flange comprising a part of said peripheral surface; a mounting portion on said housing part, a hub integrally formed with said mounting portion and including another generally annular sidewall, an end wall integral with said another sidewall and spaced from said mounting portion, recess means in said end wall, said recess means having a base wall spaced between said mounting portion and said end wall and a rim disposed in angular relation between said base wall and said end wall, an opening through at least said base wall, at least a pair of sections integrally formed on said end wall generally in off-set relation with each other and extending at least in part about said opening within said recess means, slot means extending through at least said another generally annular sidewall and said end wall and intersecting with said opening with said slot means being predeterminately sized to receive said body, said body being passed through said slot means upon the assembly of said control device with said housing part so that said groove means is registered at least in part with said opening and said opposed sidewall pair of said groove means are respectively disposed in rotatable releasable engagement with said section pair, said flange being deformed in response to the respective rotatable releasable engagement between said opposed sidewall pair and said section pair so as to establish a force acting to resiliently maintain the respective rotatable releasable engagement between said opposed sidewall pair and said section pair, and said peripheral margin on said flange being arranged at least in part within said recess means and at least adjacent said rim so as to prevent the displacement movement of said body through said slot means when said opposed sidewall pair are in the rotatable releasable engagement with said section pair.

10. An assembly adapted for use in a condition responsive mechanism and comprising a housing part adapted for association with the condition responsive mechanism, aperture means in said housing part, a control device rotatably mounted at least in part in said aperture means and adapted for selecting a set temperature of the condition responsive mechanism, said control device including a body formed of a resin material and having a resilient yieldable characteristic, groove means in said body extending generally thereabout and having a pair of opposed sidewalls, a pair of opposite sections on said housing part arranged generally in off-set relation with each other about at least a part of said aperture means and disposed in releasable wedging abutment between said opposed sidewall pair of said groove means, respectively, at least one of said sidewalls of said groove means being yieldable with respect to said body in response to the releasable wedging abutment therewith of one of said sections of said housing part to establish a force acting to maintain said sidewall pair against displacement from their respective releasable wedging abutments with said section pair.

11. An assembly as set forth in claim 10 wherein said body further includes a pair of opposite end portions, end flange means on said body between said at least one sidewall and one of said opposite end portions, said flange means being generally yieldable with said at least one sidewall.

12. An assembly as set forth in claim 11 wherein said body further includes cam means on the other of said opposite end portions.

13. An assembly as set forth in claim 11 wherein said housing part includes means for abutment with said flange means so as to prevent the displacement of said body through said aperture means when said sidewall pair are in the releasable wedging abutment thereof with said section pair, respectively.

14. An assembly adapted for use in a condition responsive mechanism, the assembly comprising a housing part adapted for association with the condition responsive mechanism and having at least a pair of wall means arranged generally in angular relation with respect to each other, aperture means in said housing means and intersecting with said at least wall means pair, a control device rotatably arranged on said housing part and adapted for selecting a set point temperature of the condition responsive mechanism, said control device including a body of generally resilient material, a pair of opposed means on said body arranged for rotative abutment in releasable engagement with opposite sides of one of said wall means of said at least pair thereof generally about a part of said aperture means, and means on said body disposed at least adjacent the other of said wall means of said at least pair thereof for engagement therewith so as to capture said body against displacement through said aperture means when said rotative abutment means are arranged in the releasable engagement with the opposite sides of said one wall means, respectively.

15. An assembly as set forth in claim 14 wherein said body includes a generally annular groove means having a pair of opposed sidewalls, said opposed sidewall pair comprising said rotative abutment means pair.

16. An assembly as set forth in claim 15 wherein said resilient material comprises a resin.

17. An assembly as set forth in claim 15 wherein said one wall means includes a pair of opposite facing sections arranged generally in off-set relation with respect to each other, said rotative abutment means pair being disposed in the releasable engagement with said section pair, respectively.

18. An assembly as set forth in claim 15 wherein said engagement means comprises a flange portion on said body and having a marginal edge portion disposed at least adjacent said other wall means.

19. An assembly as set forth in claim 14 wherein said body includes groove means extending generally thereabout and having a pair of opposed sidewalls, said sidewall pair respectively comprising said rotative abutment means pair, one of said sidewalls defining with said body a flange means thereon, said flange means comprising said engagement means, a marginal edge portion on said flange means arranged to effect the engagement with said other wall means.

20. An assembly as set forth in claim 14 wherein said engagement means includes at least a portion displaced with respect to said body in response to the respective releasable engagement between said rotative abutment means pair and said opposite sides of said one wall means with said at least displaced portion establishing a force acting to maintain the respective engagement between said rotative releasable abutment means pair and said opposite sides of said one wall means.

21. An assembly adapted for use in a condition responsive mechanism, the assembly comprising a housing part adapted for mounting association with the condition responsive mechanism, and a rotatable control device releasably secured to said housing part and adapted for selecting a set temperature of the condition responsive mechanism, said housing part including a recess therein having a pair of angularly disposed wall means, aperture means extending through said wall means pair, a pair of sections on one of said wall means extending generally adjacent at least a part of said aperture means and predeterminately spaced in opposite facing and offset relation with respect to each other, said control device including a unitary body of a generally resilient resin material, groove means in said body and extending generally thereabout for respectively receiving in releasable engagement said section pairs, said groove means defining with said body at least one flange thereon, said at least one flange being displaced in response to the releasable engagement of said groove means with said section pair so as to resile and exert a force acing to maintain the releasable engagement of said groove means with said section pair, and a portion on said at least one flange disposed at least adjacent the other of said wall means when said groove means is releasably engaged with said section pair so as to prevent the displacement through said aperture means of said body from said housing part.

* * * * *